United States Patent [19]

Diels et al.

[11] Patent Number: 5,359,410
[45] Date of Patent: Oct. 25, 1994

[54] COMPLETE DIAGNOSTICS OF ULTRASHORT PULSES WITHOUT NONLINEAR PROCESS

[75] Inventors: Jean-Claude Diels; Ming Lai, both of Albuquerque, N. Mex.

[73] Assignee: University of New Mexico, Albuquerque, N. Mex.

[21] Appl. No.: 848,890

[22] Filed: Mar. 10, 1992

[51] Int. Cl.⁵ .............................. G01B 9/02
[52] U.S. Cl. .................. 356/345; 356/353
[58] Field of Search .................. 356/345, 353

[56] References Cited

PUBLICATIONS

J. C. Diels "Autocorrelators Measure Single Laser Pulses", Laser Focus World, 25:95–100, 1989.

Primary Examiner—Samuel A. Turner
Assistant Examiner—Robert Kim
Attorney, Agent, or Firm—Albert Sopp; Robert W. Becker

[57] ABSTRACT

The present invention provides an arrangement for analyzing or reconstructing incoming pulses of electromagnetic energy in which there is detected (a) the spectral amplitude of at least one pulse and (b) the phase shifts of portions of the pulse with respect to a non-phase shifted portion, and applying an inverse Fourier transform to the detected energy thereby producing the temporal profile of the pulse.

8 Claims, 2 Drawing Sheets

COMPLETE DIAGNOSTICS OF ULTRASHORT PULSES WITHOUT NONLINEAR PROCESS

BACKGROUND OF THE INVENTION

The present invention was made with Government support under a grant from the National Science Foundation, and the United States Government has certain rights therein.

This invention relates generally to analysis and characterization of electromagnetic radiation, and more particularly, to analysis and characterization of ultrashort light or laser pulses, the time evolution of which is measured in amplitude and phase with femtosecond resolution by a linear detection technique having single shot capability, i.e., the capability to analyze and characterize a single pulse with one "look".

Several light pulse diagnostics methods have been developed in the last decade. The most common diagnostics method is the second order autocorrelation, which does not provide information on the pulse shape or on its phase modulation. One method of complete pulse characterization that has been successfully implemented makes iterative fittings of the pulse spectrum, the intensity autocorrelation and the interferometric autocorrelation [J.-C. Diels, J. J. Fontaine, I. C. McMichael, and F. Simoni. Control and measurement of ultrashort pulse shapes (in amplitude and phase) with femtosecond accuracy. *Applied Optics*, 24:1270–1282, 1985]. This method has permitted direct verification of the pulse shape and chirp predicted by theoretical models of the femtosecond laser and has also proved to have a high degree of accuracy, as can be seen from the sensitivity of the fitting function to the pulse parameters. However, since this parametric fitting procedure implies a previous estimate of the functional dependence of the pulse, the method is difficult to implement for complex shapes and modulations. Naganuma et al. [K. Naganuma, K. Mogi, and H. Yamada. Time direction determination of asymmetric ultrashort pulses from second-harmonic generation autocorrelation signals. *Appl. Phys. Lett.*, 54:1201–1202, 1989; K. Naganuma, K. Mogi, and H. Yamada. General method for ultrashort light pulse chirp measurement. *IEEE J. of Quantum Electronics*, QE-25:1225–1233, 1989.] using the same set of three data, have developed a systematic and converging fitting procedure. This iterative fitting typically uses 20 to 30 iterations. The convergence of the method has been tested on simple pulse shapes and modulations. It still remains to be determined how well the iteration converges in the case of arbitrary phase and amplitude modulation. A new pulse and chirp measurement method that can completely reconstruct the signal in amplitude and phase from a in a single measurement was demonstrated by Diels et al. [J.-C. Diels, J. J. Fontaine, N. Jamasbi, Ming Lai, and J.Mackey. The femtonitpicker. Conf. on Lasers and Electro-optics, Baltimore, June 1987, 1987; J.-C. Diels. Autocorrelators measure single laser pulses. *Laser Focus World*, 25:95–100, 1989].

An improved and simplified reconstruction method on data acquired with the same instrument was recently published [Chi Yah and J.-C. Diels. Amplitude and phase recording of ultrashort pulses. *J. of the Opt. Soc. Am. B*, 8:1259–1263, 1991]. Tests with simulated data show an excellent fidelity in reconstruction after a single iteration.

All these prior methods have in common the use of a nonlinear process where two photon fluorescence or ionization or second harmonic generation is required at the detection point. In contrast, the pulse measurement technique of the present invention is purely linear, and is therefore particularly well adapted to the detection of weak probe signals.

In order to gain further understanding of the problems associated with pulse analysis and characterization, it should be understood that standard second order autocorrelation techniques provide a mere estimate of the temporal scale in which pulse energy is contained. Most experiments involving femtosecond pulses require a much more precise and complete measurement of tile electromagnetic signal. Some examples are given below, to illustrate the importance of a diagnostic technique providing a complete temporal scale for pulse energy.

Because of normal light dispersion in optical components, significant pulse broadening will occur in any instrument involving ultrashort pulses. The pulse duration and shape will not be the same at one location where is it measured, and another location where it is used. However, knowledge of the pulse shape and phase modulation at one point can enable prediction of tile pulse characteristics at a different point where it is needed. In general, a certain amount of downchirp will be desired in order to obtain the shortest pulse after propagation through the normally dispersive optics of the equipment using the short pulses. The pulse shape and chirp (frequency change with time) can be controlled internally [J.-C. Diels, J. J. Fontaine, I. C. McMichael, and F. Simoni. Control and measurement of ultrashort pulse shapes (in amplitude and phase) with femtosecond accuracy. *Applied Optics*, 24:1270–1282, 1985] or externally (for instance with nonlinear propagation in fibers or Kerr media or reflection on nonlinear interfaces) to the source. That control is useless unless a complete diagnostic method is available to measure and to enable convergence to the shape and chirp required at the measuring point, so that the desired shape and chirp can be provided at the main interaction point of the experiment.

The above principle applies also to the propagation of ultrashort pulses through the atmosphere. The air is a dielectric with normal dispersion. There is an optimum chirp that will produce the shorter pulse after a given propagation distance. The same general principle applies to the case of nonlinear waveguides such as fibers, in which self-reproducing pulse shapes propagate without distortion for very long distances. In the case of fibers with negative dispersion, these steady state pulses are stable solutions, and are generally at near IR wavelengths. Whether there are stable or unstable solutions, the study of steady state pulse propagation in fibers is another area of research in which accurate amplitude and phase determination of ultrashort pulses is essential.

An important example of application of ultrashort pulse generation is impulsive stimulated Raman scattering [J.Nelson. Stimulated raman scattering. *Journal of the Am. Optical Society B*, 8:1264–1266, 1991]. Instead of a simple impulse, the signal applied to the sample is modulated at a frequency matching a molecular vibration. More generally, in any type of coherent interaction, the excitation of the medium follows a path that is dependent of the exact shape (in amplitude and phase) of the resonant signal applied to the system. Here again, a diagnostic method is needed to monitor the exact signal driving the resonance.

A typical method to measure transient transmission is the pump-probe technique. Obviously, the resolution is limited by the duration of the pump probe, since it is necessary to wait until the excitation is complete before probing its result. The purpose of this experiment is to determine the complete temporal response (or transfer function) of the material to an signal at the source wavelength. If a complete measurement can be made of the input signal $E(t)=[\tilde{E}(t)+c.c.]$ and of the transmitted signal $E_t(t)=[\tilde{E}_t(t)+c.c.]$, then the transfer function of the material (in transmission) is uniquely defined. The temporal resolution in this technique is as good as the accuracy with which the pulse shape is determined.

It is generally not the total duration of the pulse that determines the temporal resolution in a pump-probe experiment, but either the rise or fall of the pump and probe. If a reasonably good model exists for the process under investigation, deconvolution procedures can be used to extract time constants with an accuracy better than the pulse duration.

SUMMARY OF THE INVENTION

The present invention provides a linear detection technique for characterizing or reconstructing one or more ultra short electromagnetic pulses such as light pulses or laser pulses. The pulse or pulses are measured in amplitude and phase in the frequency space or spectrum. The relative phase of the spectral components is obtained by dispersing the pulse into a spectrum and measuring the relative phase with an appropriate interferometer. Because the first order cross correlation between different spectral components in the Fourier space is a sensitive function of both the spectral amplitudes and their relative phase, it is possible to cross-correlate different spectral components. This is because each section of the output beam from a low-resolution spectral analyzer is a pulse longer than the initial pulse, but shorter than the beating period corresponding to tile spectral components to be correlated. According to the invention, either single shot pulse measurement or cumulative measurements of a pulse train may be carried out and then correlated to provide the spectral amplitude and relative phase of its frequency components.

BRIEF DESCRIPTION OF THE DRAWINGS

Reference is now made to the drawings in which.

DETAILED DESCRIPTION OF THE INVENTION

Figure 1:
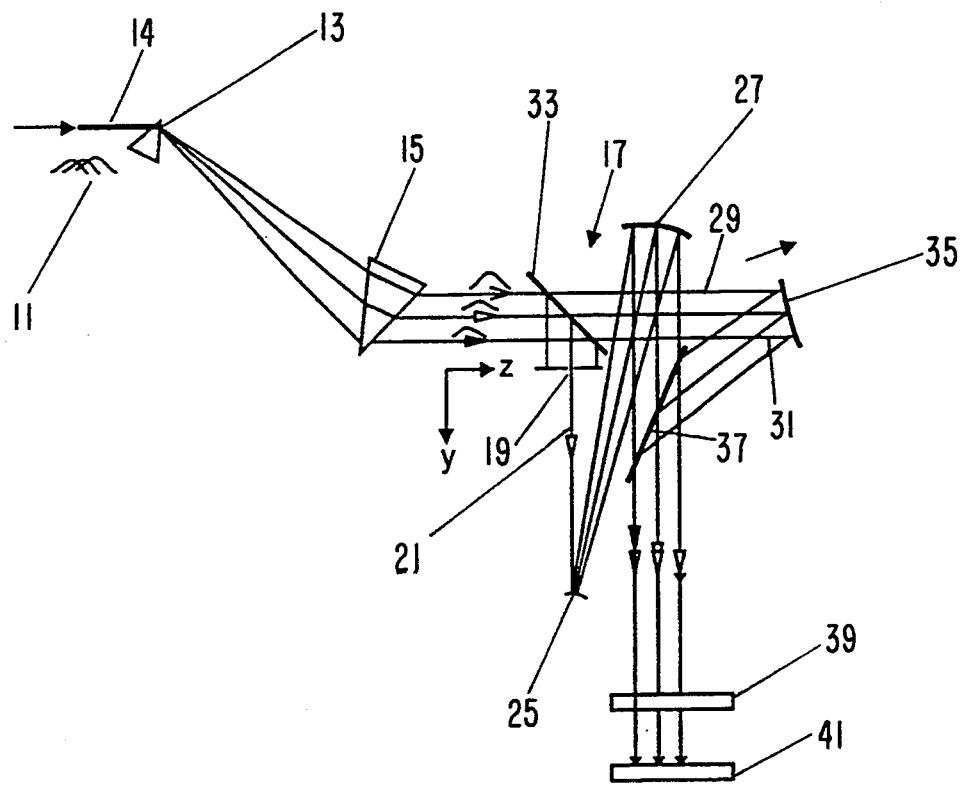
FIG. 1 is a schematic diagram of a phase and amplitude measuring arrangement according to an embodiment of the invention.

Referring to FIG. 1, pulses to be diagnosed such as femtosecond pulses from a mode-locked dye laser 11 of given beam diameter are sent through a pair of dispersing prisms 13 and 15, which serve as a low-resolution spectral analyzer. For a beam of finite cross section, different frequency components are transversally displaced by the pair of prisms 13, 15. The total amount of glass of the prisms is set for zero group velocity dispersion [K. L. Schehrer, R. L. Fork, J. Avramopoulos, and E. S. Fry. Derivation and measurement of the reversible temporal lengthening of femtosecond optical pulses for the case of a four-prism sequence. *Opt. Lett.*, 15:550–552, 1990; J. P. Gordon and R. L. Fork. Optical resonator with negative dispersion. *Opt. Lett.*, 9:153–156, 1984; F. J. Duarte. Prismatic pulse compression: beam deviations and geometrical perturbations. *Optical and Quantum Electronics*, 22:467–471, 1990]. The transversely dispersed beam is sent into a modified Mach-Zenhder interferometer 17. A slit 19 with an opening the same as the original beam diameter is inserted in one of the arms of the interferometer 17 to select only the central portion 21 of the beam spectrum. The selected beam portion 21 is used as a reference or selected spectral component and expanded by a pair of cylindrical mirrors 25 and 27 to the beam width of the full spectrum. In the other arm of the interferometer, the outer portions of the beam spectrum 29 and 31 are passed through a beam splitter 33. All three spectral portions of the beam 21, 29 and 31 are deflected by mirror 35, then deflected by a beam splitter 37 for detection on a photo-diode array 39. The photo diode array is used to record the output from the interferometer. Cross correlation between each of the spectral components and the selected central spectral component is made by varying the relative delay between the two interferometer arms. The interference pattern of the cross correlation can then be displayed as a function of both the spectral location and the relative delay, either directly from array 39, or with a computer 41 in any suitable well known manner.

To any transverse (or spectral) coordinate y (FIG. 1) corresponds a pulse centered at the frequency determined by y. This property has been applied also in nonlinear techniques of measurement of pulse shapes [J. L. A. Chilla and O. E. Martinez. "Direct determination of the amplitude and the phase of femtosecond light pulses." *Opt. Lett.*, 16:39–41, 1991; K. L. Schehrer, R. L. Fork, J. Avramopoulos, and E. S. Fry. "Derivation and measurement of the reversible temporal lengthening of femtosecond optical pulses for the case of a four-prism sequence." *Opt. Lett.*, 15:550–552, 1990].

By varying the delay $\tau$, a first order cross-correlation can be obtained between the pulse at y, and the pulse from the reference beam, which as shown is at the center frequency corresponding to the selected spectral component. The center of gravity $\tau_c$ of these cross-correlations plotted versus the spectral variable y provides information on the temporal distribution of frequencies across the pulse. It has been shown that the information thus recorded is sufficient for a complete reconstruction of the pulse [J. L. A. Chilla and O. E. Martinez. "Direct determination of the amplitude and the phase of femtosecond light pulses." *Opt. Lett.*, 16:39–41, 1991].

Figure 2:
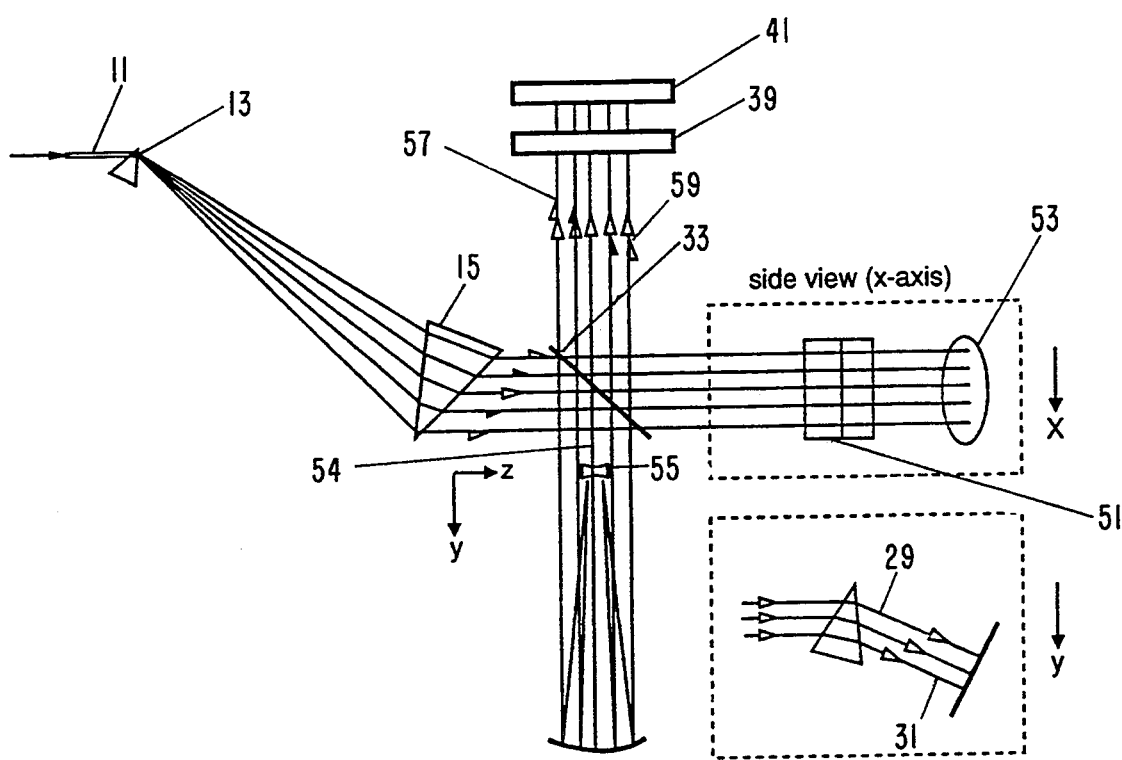
FIG. 2 is schematic diagram of an arrangement for measuring or reconstructing the phase and amplitude of an ultrashort pulse in accordance with another embodiment of the invention.

The further embodiment of the invention shown in FIG. 2 includes a relative delay in the x-direction of the reference beam. The used of a prism for in, posing this delay, but in a non-linear diagnostic arrangement, is explained in the article by: Szabo, G., Bor, Z. and Muller, A. entitled "Phase sensitive single-pulse autocorrelator for ultrashort laser pulses", *Optics Letters* 13:746–748 (1988); and in the article by: J.-C. Diels and J. J. Fontaine and W. Rudolph, entitled "Ultrafast diagnostics", *Revue Phys. Appl.*, 22, 1605–1611, (1987). This relative delay stems from the fact that at different locations of x, the beam experiences different amount of glass. This arrangement thus provides a complete diagnostic of a single ultrashort pulse with "one look", i.e. with a single shot measurement.

As shown in the embodiment of FIG. 2, where like reference numerals refer to like elements of the embodiment of FIG. 1, after passage of the light beam through dispersive prisms 13 and 15 providing y axis dispersion as previously described in connection with FIG. 1, the beam is passed through prism 51 and reflected by mirror 53 to provide x axis pulse-front dispersion (delay of the pulsefront versus x). Alternatively, a grating or a stepped mirror may be used to produce this distribution of delays in the x direction. These devices arc well known in the art. Thus, for a single input pulse, there is a different delay of the beam for each x axis position, thus eliminating the need for multishot measurements, i.e. one after the other, for stepped displacements of the mirror along the propagation direction of the beam. As further shown in FIG. 2, a central portion 54 of the beam 11 is passed via half mirror 33 to a dispersion lens 55 to provide a reference position of the beam to be correlated with the respective advanced and delayed x-axis portions 57 and 59 of the beam, as measured by the 2 dimensional photodiode array 39 and computer 41 for correlation purposes in the manner described in connection with FIG. 1.

The mathematics performed by the computer or by any other suitable means is as follows:

We will assume that the signal of central frequency $\omega_0$ has an arbitrary (complex) temporal profile of amplitude $E(t) = \tilde{E}(t)\exp[-\phi(t)]$ and a Gaussian transverse profile:

$$E_i(x,y,z,t) = \tilde{e}(t - z/c) e^{-[(\frac{x}{w_x})^2 + (\frac{y}{w_y})^2] - i\Omega z/c}.$$

$\omega_x$ is the beam radius in the x direction, $\omega_y$ the beam radius in the y direction. We find the spatial-spectral field amplitude by multiplying the Fourier transform $E_i(x,y,z,\Omega)$ of Eq. (1) by the transfer function of the pair of prisms $T(\Omega)$. If the pair of prisms are adjusted for negligible longitudinal group velocity dispersion, the field spectral amplitude after the prism pair is given by:

$$E_0(x,y,z,\Omega) = \epsilon(\Omega) e^{\{-[(\frac{x}{w_x})^2 + (\frac{y-a\Delta\Omega}{w_y})^2] - i\Omega z/c + i\phi(\Omega)\}} \quad (2)$$

where the term $a\Delta\Omega = a(\Omega - \omega_0)$ accounts for the linear dispersion along the y direction. The phase origin in the frequency domain is chosen at the pulse central frequency $\omega_0$: $\phi(\omega_0) = 0$. Since the coordinate y refers to a narrow spectral component of the pulse, the duration of the inverse Fourier transform signal at that particular y value will be longer than and independent of the original pulse. With the assumption that the spectral amplitude and phase $E(\omega)$ and $\phi(\omega)$ do not change significantly over the spectral width $\omega_y/a$, where $\omega_y$ is the beam radius in the y direction, and a is the conversion factor from distance to frequency defined above, we can substitute in Eq. (2) the first order approximation:

$$\epsilon(w) = \epsilon(w_0 + y/a) + \frac{\partial \epsilon(w)}{\partial w}\bigg|_{(w_0+y/a)} [w - (w_0 + y/a)] \quad (3)$$

$$\phi(w) = \phi(w_0 + y/a) + \frac{\partial \phi(w)}{\partial w}\bigg|_{(w_0+y/a)} [w - (w_0 + y/a)]$$

$$= \phi(w_0 + y/a) + \phi'_{w_0+y/a}.$$

Taking the inverse Fourier transform leads to:

$$\epsilon_0(x,y,z,t) = \frac{w\sqrt{\pi}}{a} \epsilon(w_0 + y/a) \quad (4)$$

$$\exp\left\{-\frac{x^2}{w_x^2} - \left[\frac{t - \frac{z}{c} - \phi_{w_0+y/a}'}{\tau_y}\right]^2 + \left(iw_0 + \frac{y}{a}\right)\left(t - \frac{z}{c}\right) + i\phi\left(\omega_0 + \frac{y}{a}\right)\right\}$$

Equation (4) shows that any component y of the pulse is stretched into Gaussian pulse of $1/e$ duration $\tau_y = 2a/\omega_y$. An important quantity to be determined from the crosscorrelation is the shift of the pulse center by a delay $\tau_d = \phi'_{\omega_0+y/a}$, which leads to the determination of the spectral phase. The y dependence of the time integrated signal obtained by direct detection of the radiation described by eq. (4) with a photodiode array lead to the pulse spectral amplitude $E(\omega)$.

The pulse from the reference arm (e.g. the selected central frequency) is simply, within a scale factor A, the value of the expression (4) at $y=0$. The first order crosscorrelation between that reference signal and the field given by Eq. (4) is:

$$A(x,y,\tau) = \int_{-\infty}^{\infty} Re\{E_0(x,y,z,t)E_r^*(x,y,z,t)\}dt \, \alpha \, \epsilon \, (w_0 + \quad (5)$$

$$y/a)\epsilon(w_0)\exp\left\{-\frac{x^2}{w_x^2} - \frac{[\tau - \phi_{w_0+y/a} + \phi_{w_0}']^2}{2\tau_y^2} - \right.$$

$$\left.\left(\frac{y\tau 2}{2a\sqrt{2}}\right)^2\right\}\cos\left\{\left(w_0 + \frac{y}{2a}\right)\tau - \frac{y}{a}[\phi_{w_0+y/a} - \phi_{w_0}'] + \right.$$

$$\left. \phi\left(w_0 + \frac{y}{a}\right)\right\}$$

In the above Eq. (5) $\tau$ is the delay parameter of the correlator. The above equation still applies for the single shot arrangement, with the substitution $\tau = bx$, where b is a parameter associated with the particular prism or grating used to generate the delay along x. The range of delay $\Delta w$ that is needed is $$\Delta x = \frac{2a}{\Delta y},$$

where $\Delta y$ is the spread of pulse along y due to the spectral bandwidth of the pulse. A necessary condition for the single shot version is the the with of the beam along x be large ($w_x >> \Delta x$).

Equation (5) indicates that:
the cross correlation profile is a Gaussian of width $2\tau_y\sqrt{\ln 2}$(FWHM), regardless of the initial pulse shape [J. L. A. Chilla and O. E. Martinez. Direct determination of the amplitude and the phase of femtosecond light pulses. *Opt. Lett.*, 16:39–41, 1991].

the center of the profile at a given frequency $\omega=\omega_0+y/\alpha$ is shifted by the frequency derivative of the spectral phase $\phi'_{\omega_0+y/\alpha}$ the amplitude profile is modified by a factor $$E(\omega_0 + y/a)\exp\left[-\left(\frac{y\tau_y}{2a\sqrt{2}}\right)^2\right]$$

which can be determined by measuring $y, \tau_d$ and $E(\omega_0+y/\alpha)$ the fringes of the cross correlation have a frequency $\omega_0+y/2\alpha$, and a phase shift $-y/\alpha[\phi'_{\omega_0+y/\alpha}-\phi'_{\omega_0}]+\phi(\omega_0+y/\alpha)$.

From the cross correlation pattern, $\phi'$ can be determined, and the relative phase $\phi$ can be obtained by integration:

$$\phi(w) + \int_{w_0}^{w} \phi'(w)dw = \frac{1}{a}\int_0^y \phi_{w_0+y/a'}dy \quad (6)$$

Since the pulse spectral amplitude is known from the recording of total integrated signal versus y (reference arm blocked), and the spectral phase is determined from Eq. (6), a simple inverse Fourier transform leads to a complete determination of the pulse temporal profile, in amplitude and phase. All of these operations may be performed in any suitable well known computer or by hand in carrying out the inventions.

The replacement of a delay line by a prism or a grating is detailed in chapter of a book on femtosecond Physics, by Diels and Rudolph, to be published by Academic Press. Copy of the relevant pages is attached. Calculations of the use of prism or grating to provide for the x-delay can also be found in: Z. Bor, *Optics Letters* 14:119–121 (1989).

We claim:

1. A method of determining or reconstructing the temporal phase and amplitude profile of one or more incoming pulses of electromagnetic energy comprising the steps of:
   a) phase shifting along at least one axis less than all of the spectral portions of an incoming pulse;
   b) detecting the spectral amplitude of the pulse and the extent of shift of the phase-shifted portions of the pulse in relation to a non-shifted portion to produce and output, the non-shifted portion comprising a central frequency of the pulse spectrum; and
   c) applying an inverse Fourier transform to said output whereby the temporal profile of the pulse in amplitude and phase is determined.

2. The method of claim 1 wherein the pulse is in the spectrum of approximately infrared to ultraviolet.

3. The method of claim 1 wherein the incoming pulse is phase shifted along two axes.

4. An apparatus for determining or reconstructing the temporal phase and amplitude profile of one or more incoming pulses of electromagnetic energy comprising:
   a) means for dispersing the pulse into a plurality of spectral components phase shifted with respect to each other and with respect to a non-phase shifted reference component comprising a central frequency of the pulse spectrum;
   b) means for aligning the reference component with each phase shifted component;
   c) means for detecting the relative displacement of each phase shifted component and for detecting the pulse spectral amplitude of at least one of said incoming pulses to provide an output; and
   d) means for applying an inverse Fourier transform to said output whereby there is produced a temporal profile in amplitude and phase of at least one of said incoming pulses.

5. Apparatus as in claim 4 wherein the electromagnetic energy is in the optical range.

6. Apparatus as in claim 5 wherein said dispersing and aligning means comprise optical delay means.

7. Apparatus as in claim 6 wherein said detecting means comprises a photo detector array.

8. Apparatus as in claim 7 wherein said applying means comprises a computer.

* * * * *